June 11, 1940. P. H. BATTEN ET AL 2,204,337
CLUTCH
Filed Jan. 13, 1938 3 Sheets-Sheet 1
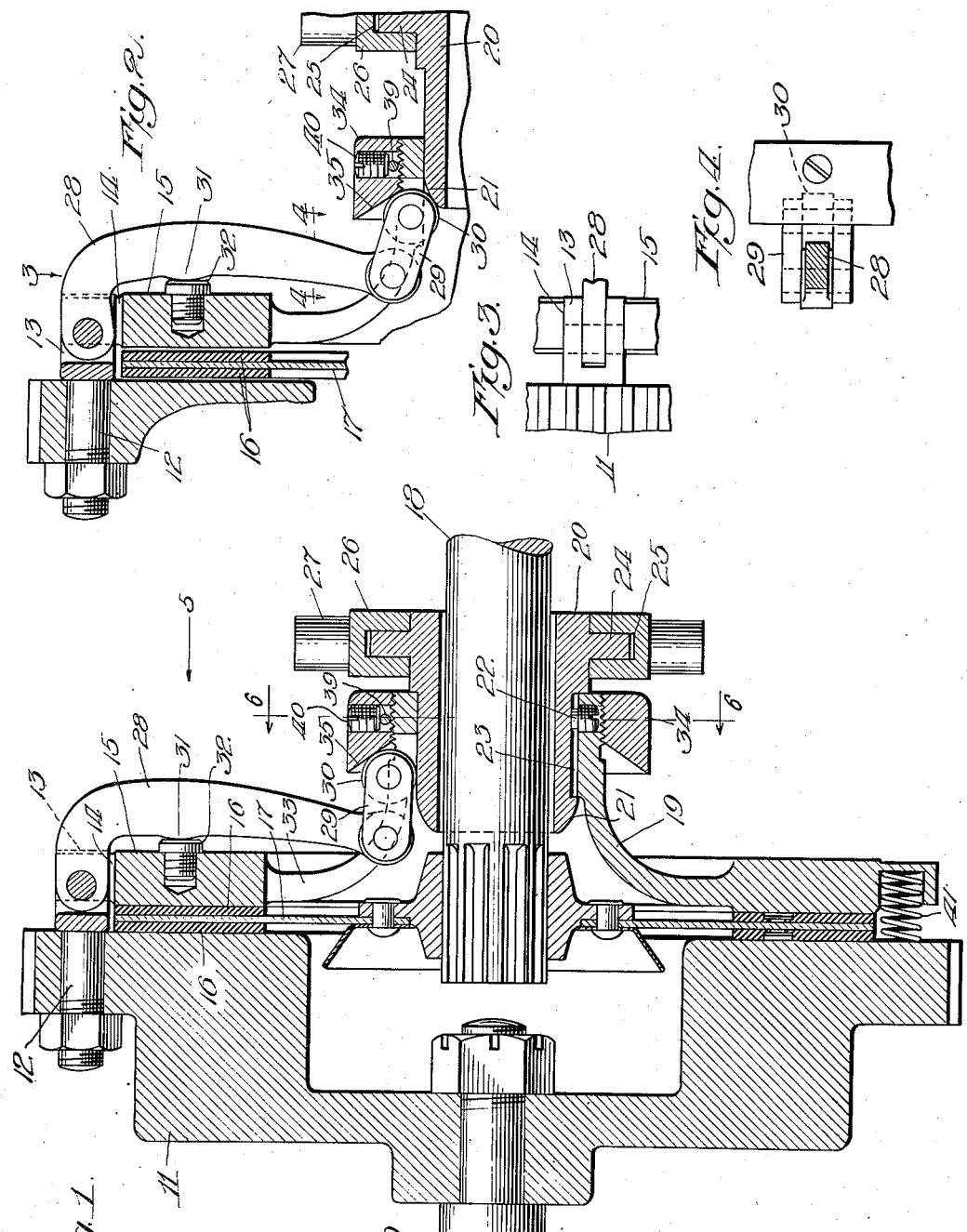

June 11, 1940. P. H. BATTEN ET AL 2,204,337
CLUTCH
Filed Jan. 13, 1938 3 Sheets-Sheet 2
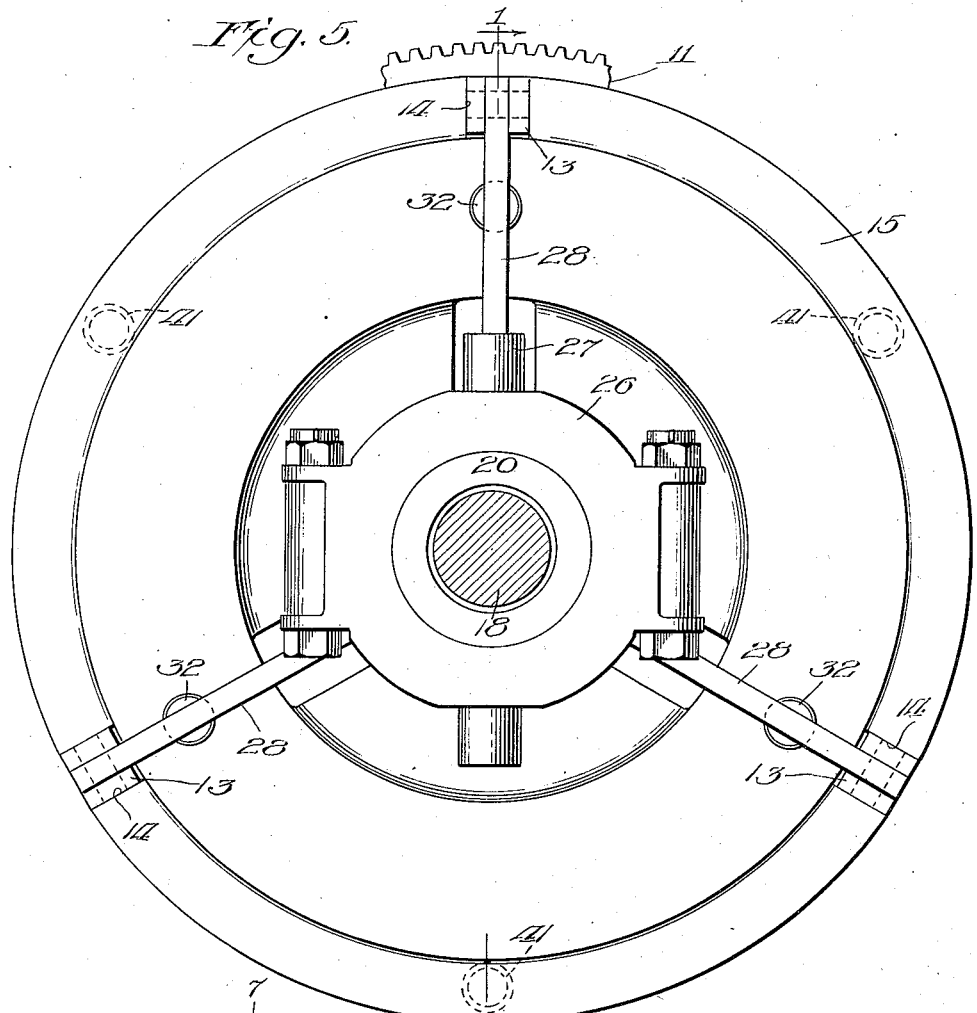
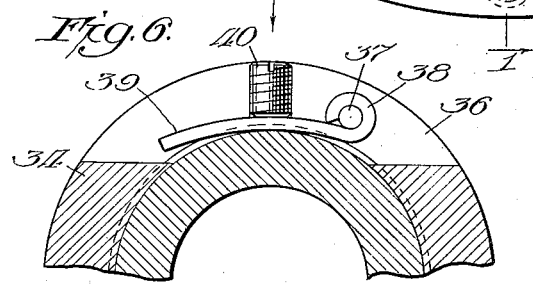
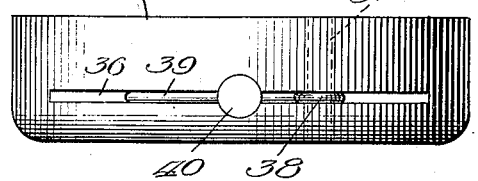
Inventors:
Percy H. Batten and
Donald N. Morris
by Davis, Lindsey, Smith & Shonts
Attys.

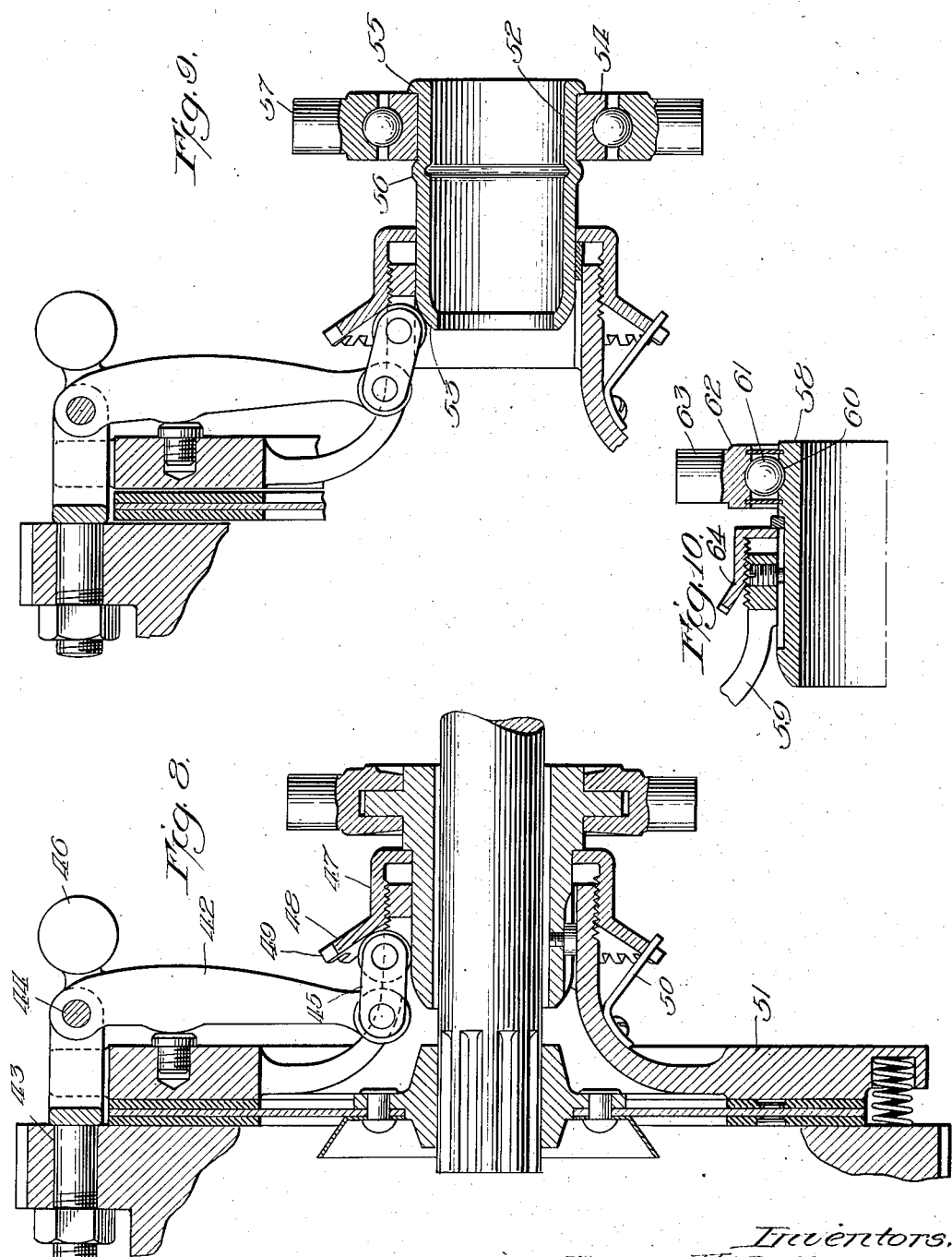

Patented June 11, 1940

2,204,337

UNITED STATES PATENT OFFICE 2,204,337

CLUTCH

Percy H. Batten and Donald W. Morris, Racine, Wis., assignors to Twin Disc Clutch Company, Racine, Wis., a corporation of Wisconsin Application January 13, 1938, Serial No. 184,748

23 Claims. (Cl. 192—68)

Our invention relates to clutches of the mechanically loaded type and is more particularly concerned with a construction in which one of the interconnected rotary elements constitutes one of the clamping members of the clutch.

One object of our invention is to provide a clutch in which the major operative elements, including the movable clamping plate, are supported directly, or indirectly through the plate, by the devices which drivably connect the plate to a rotary part forming one of the members of the clutch.

A further object is to provide a clutch in which the clamping plate and the associated elements are arranged for easy and rapid attachment to and detachment from a flywheel or other rotary part, thus facilitating repair and replacement of the component elements.

A further object is to devise a clutch in which the operating levers are held in driving position against inadvertent release and are maintained in non-rattling, release position by centrifugal force and the extending action of release springs.

Further objects are to provide simple and effective forms of locking for the adjusting ring of the clutch, the economical fashioning of the adjusting ring and operating sleeve out of sheet metal, and the use of the operating sleeve as one race of a ball bearing whose outer race functions as the operating collar.

These and further objects of our invention will be set forth in the following specification, reference being had to the accompanying drawings, and the novel means by which said objects are effectuated will be definitely pointed out in the claims.

In the drawings:

Figure 1 is a sectional elevation of one form of our improved clutch, as taken along the line 1—1 in Fig. 5, looking in the direction of the arrows, the clutch being shown in engaged position;

Fig. 2 is a fragmentary, sectional view, similar to that shown in Fig. 1, but showing the clutch in released position;

Fig. 3 is a fragmentary view, looking in the direction of the arrow 3 in Fig. 2, showing the connection of one of the operating levers to a driving pin;

Fig. 4 is a section along the line 4—4 in Fig. 2, looking in the direction of the arrows, and showing the relation of the adjusting ring to one of the operating links;

Fig. 5 is an end view of the clutch, partly in section, as viewed in the direction of the arrow 5 of Fig. 1;

Fig. 6 is an enlarged section, taken along the line 6—6 in Fig. 1, looking in the direction of the arrows, and showing the locking means employed to hold the adjusting ring in any determined position;

Fig. 7 is a plan view of the construction shown in Fig. 6, looking in the direction of the arrow 7 in said figure;

Fig. 8 is a sectional elevation of a modified form of our improved clutch, corresponding to that illustrated in Fig. 1, but showing a different arrangement of the operating lever and a structural variation of the adjusting ring;

Fig. 9 is a sectional view of a further modification, the clutch being shown in released position, and including a form of operating sleeve which may be simply made from sheet metal or tubing; and Fig. 10 is a fragmentary sectional view showing a further type of operating sleeve which may be additionally arranged to act as the inner race of a ball bearing whose outer race serves as the operating collar.

Referring to Figs. 1 to 7, inclusive, of the drawings, the numeral 10 designates a shaft constituting one of the rotary parts that are interconnected by the clutch structure hereinafter described and which, for purpose of example, may be regarded as a drive shaft, although the conditions of operation may be reversed as to this particular. A flywheel 11 is secured to the shaft 10 and carries in circumferentially spaced relation adjacent its periphery a plurality of driving pins 12, three such pins being shown in the present arrangement. The bifurcated end 13 of each pin extends beyond the right face of the flywheel 11, as viewed in Fig. 1, for driving connection with a slot 14 cut inwardly from the edge face of a shiftable clamping plate 15. These pins not only serve as a driving connection, but additionally support the plate on the flywheel.

The opposed faces of the flywheel and plate are intended to frictionally engage facings 16 of suitable material which are secured to opposite sides of a clutch plate 17 that is drivably connected to a driven shaft 18 so that it is free to assume positions between the plate and flywheel.

The plate 15 is provided with an integral tubular extension 19 that is bored to supportably receive an operating sleeve 20 in coaxial relation to the shaft 18. The inner end of this sleeve is shaped with a conical surface 21 and the sleeve is held against rotation relative to the extension 19 by a set screw 22 that is threaded in the extension and has an end projecting into a keyway 23 formed in the sleeve. Accordingly, the sleeve partakes of the rotary movement of the clamping plate, but is adapted to move in axial directions relative thereto. Endwise movement of the sleeve is effected through the medium of an annular flange 24 provided on the sleeve which fits within an annular groove 25 provided in an operating collar 26. Integrally formed with this collar is a pair of trunnions 27 that may be engaged by a suitable shifting device (not shown), such as the usual fork.

The operating mechanism for the clutch comprises a plurality of levers 28, each of which has its outer end pivotally mounted between the arms of the bifurcated end of a driving pin 12, this pivotal connection in the present instance lying within the plane of the clamping plate 15. Each lever is then bent and extends inwardly toward the shaft 18 relatively close to the adjacent face of the clamping plate and, at its inner end, is pivotally connected to one end of a dual link structure 29 whose opposite end rotatably supports between the elements of the link a roller 30. The inner edge face of that portion of the lever which extends along the outer face of the clamping plate is provided with a boss 31 which is intended to abut against a pin 32 that is mounted in the plate, so that when the lever is moved in a clockwise direction, as hereinafter described, the clamping plate 15 will be shifted to a driving position. Clearance for the inner ends of the levers and links is provided by forming a number of openings 33 in the extension 19.

The extension is externally threaded to receive an adjusting ring 34 whose inner or left face is beveled as at 35 to provide an inclined surface for coacting with the roller 30 as hereinafter explained. In order to maintain the ring 34 in any adjusted position, a slot 36 is cut inwardly from the peripheral wall thereof to a depth sufficient to expose a parti-circular portion of the threads of the extension 19 and a pin 37 is bridged between the walls of this slot. Encircling this pin is one end of a wire 38 whose opposite end is cut to a length sufficient to provide a slender finger 39 which is gripped against the threads of the extension 19 by means of a set screw 40. New positions of the adjusting ring may be effected from time to time simply by withdrawing the set screw 40 sufficiently to relieve the pressure of the finger 39, making the adjustment and again clamping the finger in locking position.

In describing the operation of our improved clutch, it will be understood that the coned end 21 of the sleeve 20 constitutes the primary element of a device for actuating the operating mechanism represented by the lever 28 and the associated parts and that the beveled surface 35 functions as the secondary element during this operation; also, that, when the parts are occupying the released position shown in Fig. 2, the position of the roller 30 in contact with the surfaces 21 and 35 is maintained by the pressure of the release springs 41 which are interposed in circumferentially spaced relation between the face of the flywheel and appropriate pockets formed in the face of the clamping plate 15, and also by centrifugal force operating on the lever 28. Due to the mass of this lever and the position of its pivotal connection to the driving pin 12, it overcomes the tendency of the roller 30 to move outwardly under the influence of centrifugal force.

To engage the clutch, the sleeve 20 is moved toward the left from the position shown in Fig. 2, thereby causing a corresponding movement on the part of the link 29 and effecting a clockwise movement of the operating lever 28. During this action, the roller 30 bears against the inclined surface 35 as an abutment, to thereby effect an axial movement of the clamping plate 15 toward the flywheel.

The foregoing action continues as the sleeve 20 is moved toward the left and, as the roller 30 moves outwardly along the coned surface 21, it also moves toward the flywheel due to the inclination of the surface 35. This operation is essentially in the nature of a pinching action in which the surfaces 21 and 35 operate as the jaws of the pincer but with the surface 21 moving relatively to the other surface. Eventually, the sleeve 20 is moved to the position illustrated in Fig. 1 and, at this time, the roller 30 rests on the cylindrical surface of the sleeve 20 and the operating elements of the clutch are substantially locked in the engaged position.

When the sleeve 20 is moved from the position illustrated in Fig. 1 toward that illustrated in Fig. 2, the roller 30 finally rides inwardly along the surface 21 and this action is essentially effected by the extending movement of the release springs 41 and the centrifugal movement of the levers 28, as already described.

The modified construction illustrated in Fig. 8 differs from that above described in that each operating lever 42 is connected by a pivot pin 44 to a driving pin 43 at a point offset exteriorly from the clamping plate and, preferably, so that the pivot pin 44 lies in the same plane transverse to the axis of the clutch that includes the pivotal connection of the inner end of the lever to the link 45. This change in the pivotal connection of the lever and driving pin facilitates manufacture and also assembly in the field and, in order to insure proper releasing movement of the lever, a counterbalance weight 46 is carried by the lever in the place generally indicated, or some other suitable position along the length of the lever.

A further structural change in this particular modification consists in the use of an adjusting ring 47 which is preferably formed from sheet metal and embodies an annular, flared flange 48 whose inner surface performs the same function in the operation of this modification as does the inclined surface 35 in Fig. 1. The adjusted position of this ring may be effected by providing the periphery of the flange 48 with a plurality of slots 49 for receiving the end of a spring finger 50 that is carried by the tubular extension of the clamping plate 51. Otherwise, the structural details and operation of this modification are identical with those already described.

In the further modification illustrated in Fig. 9, the particular differentiation from the construction illustrated in Fig. 8 resides in the use of an operating sleeve 52 that may be made from sheet metal of appropriate gauge, or simple tubing. In a functional sense, this sleeve corresponds to the sleeve 20 in Fig. 1. The inner end of the sleeve 52 may be bent to form a coned end 53, corresponding to the surface 21 in Fig. 1, and encircling and closely fitting the opposite end of the sleeve is the inner race of a ball bearing 54. Endwise movement of this bearing in one direction is prevented by curling outwardly the adjacent end of the sleeve 52, as indicated generally by the numeral 55, and, in the opposite direction, by rolling an internal groove in the wall of the sleeve 52 to provide an annular boss 56. Also, the outer race of the bearing 54 may have integrally formed therewith trunnions 57 for engagement with the usual shifting device (not shown). Obviously, the use of sheet metal for the adjusting and operating sleeve materially reduces the manufacturing cost of the clutch.

In Fig. 10 is illustrated a further modified arrangement of an operating sleeve 58 which may be associated with the tubular extension 59 of a clamping plate (not shown) in the same manner as already described for the structure illustrated in Fig. 1. In this modification, the sleeve 58 is intended to function as the inner race of a ball bearing and, for this purpose, an annular groove 60 is formed in the outer surface adjacent the end thereof to receive a plurality of balls 61. Encircling these balls is an outer race 62 that may have integrally formed therewith the usual trunnions 63 for a purpose already discussed. An adjusting ring 64, similar to the ring 47, may be employed in this modification.

It will, of course, be understood that the several elements as above described may be associated in any various combinations. For example, the adjusting ring, operating sleeve and levers shown in Fig. 9 may be substituted for the corresponding parts illustrated in Fig. 1, and vice versa. Also, the operating sleeve illustrated in Fig. 10 may be substituted for any of the sleeves shown in the remaining figures of the drawings.

In all of the modifications, and since the operative levers have a constant throw, suitable adjustment of the clutch may be effected as the friction facings wear by properly rotating the adjusting ring and thereafter locking the same in position. Generally speaking, the advantages of the clutch are its compactness of design, ease and adjustment of operation, ease of attachment and detachment to and from the flywheel through the medium of the driving pins, and the economy in certain of the modifications resulting from the use of sheet metal for the adjusting ring and operating sleeve. Finally, it will be understood that the flywheel which is illustrated as constituting one of the clamping members of the clutch is generally indicative of any member that may be used for this purpose and may, for example, be formed simply as an ordinary plate or disc.

We claim:

1. In a clutch, the combination with a drivably connected clamping member and shiftable clamping plate adapted to grip a clutch plate therebetween, of an operating lever pivotally connected to the member and adapted to bear against the clamping plate and shift the same to clamping position, a link pivoted at one end on the lever, and pinching means for shifting the lever to clamping position comprising coacting parts having angularly disposed surfaces engageable with the opposite end of the link, one of the parts being movable relative to the other.

2. In a clutch, the combination with a drivably connected clamping member and shiftable clamping plate adapted to grip a clutch plate therebetween, of an operating lever pivotally connected to the member and adapted to bear against the clamping plate and shift the same to clamping position, a link pivoted at one end on the lever, and pinching means for shifting the lever to clamping position comprising coacting parts having angularly disposed surfaces engageable with the opposite end of the link, one of the parts being movable relative to the other and the other part being carried by an extension provided on the plate.

3. In a clutch, the combination with a drivably connected clamping member and shiftable clamping plate adapted to grip a clutch plate therebetween, of an operating lever pivotally connected to the member and adapted to bear against the plate and shift the same to clamping position, a link pivoted at one end on the lever, and pinching means for shifting the lever to clamping position comprising coacting parts having angularly disposed surfaces engageable with the opposite end of the link, one of the parts being movable relative to the other and both parts being carried by an extension provided on the clamping plate.

4. In a clutch, the combination with a drivably connected clamping member and shiftable clamping plate having a tubular extension coaxial with the clutch, the member and plate being adapted to grip a clutch plate therebetween, of an operating lever pivotally connected to the member and extending inwardly toward the axis of the clutch relatively close to and adapted to bear against the outer face of the clamping plate, a link pivoted at one end on the lever, a sleeve slidable in the extension and an adjusting ring threaded externally on the extension, the sleeve and ring having angularly disposed surfaces engageable with the opposite end of the link to shift the same and the connected lever to clamping position.

5. In a clutch, the combination with a drivably connected clamping member and shiftable clamping plate having a tubular extension coaxial with the clutch, the member and plate being adapted to grip a clutch plate therebetween, of an operating lever pivotally connected to the member and extending inwardly toward the axis of the clutch relatively close to and adapted to bear against the outer face of the clamping plate, the pivot connection of the lever to the member lying substantially in the plane of the clamping plate, a link pivoted at one end on the lever, a sleeve slidable in and an adjusting ring threaded externally on the extension, the sleeve and ring having angularly disposed surfaces engageable with the opposite end of the link to shift the same and the connected lever to clamping position.

6. In a clutch, the combination with a drivably connected clamping member and shiftable clamping plate having a tubular extension coaxial with the clutch, the member and plate being adapted to grip a clutch plate therebetween, of an operating lever pivotally connected to the member and extending inwardly toward the axis of the clutch relatively close to and adapted to bear against the outer face of the clamping plate, a link pivoted at one end on the lever, the pivotal connections of the lever to the member and link, respectively, lying in substantially the same plane, a sleeve slidable in and an adjusting ring threaded externally on the extension, the sleeve and ring having angularly disposed surfaces engageable with the opposite end of the link to shift the same and the connected lever to clamping position, and a counterweight carried by the lever and offset from the plane including said pivotal connections to assist in the releasing movement of the lever.

7. In a clutch, the combination with a drivably connected clamping member and shiftable clamping plate having a tubular extension coaxial with the clutch, the member and plate being adapted to grip a clutch plate therebetween, of an operating lever pivotally connected to the member and extending inwardly toward the axis of the clutch relatively close to and adapted to bear against the outer face of the clamping plate, a link pivoted at one end on the lever, a sleeve slidable in and an adjusting ring threaded externally on the extension, the sleeve and ring having angularly disposed surfaces engageable with the opposite end of the link to shift the same and the connected lever to clamping position, and release springs interposed between the clamping plate and member for maintaining contact of the end of the link with the surfaces when the clutch is released.

8. In a clutch, the combination with a drivably connected clamping member and shiftable clamping plate having a tubular extension coaxial with the clutch, the member and plate being adapted to grip a clutch plate therebetween, of an operating lever pivotally connected to the member and extending inwardly toward the axis of the clutch relatively close to and adapted to bear against the outer face of the clamping plate, a link pivoted at one end on the lever, a sleeve slidable in the extension, an adjusting ring threaded externally on the extension and having an outwardly directed flange provided with a multislotted peripheral edge, the sleeve and ring having angularly disposed surfaces engageable with the opposite end of the link to shift the same and the connected lever to clamping position, and a spring finger carried by the clamping plate and engageable with one of the slots to maintain the ring in adjusted position.

9. In clutch construction comprising friction plates for providing a driving connection between rotary parts and lever means for engaging the plates, the combination of a member mounted to rotate with one of the plates, an adjusting ring threaded on the member and adapted to act as an abutment for the lever means, a pressure element carried by the ring for engaging the threads on the member to maintain the adjusted position of the ring, and means carried by the ring for forcing the element into contact with the threads.

10. In clutch construction comprising friction plates for providing a driving connection between rotary parts and lever means for engaging the plates, the combination of a member mounted to rotate with one of the plates, an adjusting ring threaded on the member and adapted to act as an abutment for the lever means, a wire finger pivoted on the ring to engage the threads on the member and maintain the adjusted position of the ring, and a set screw carried by the ring for forcing the finger into contact with the threads.

11. In a clutch, the combination with a drivably connected clamping member and shiftable clamping plate adapted to grip a clutch plate therebetween, of an operating lever pivotally connected to the member and adapted to bear against the clamping plate and shift the same to clamping position, a link pivoted at one end on the lever, and means engageable with the opposite end of the link comprising an abutment part and a part movable relative to the abutment part, the movable part swinging the link against an inclined surface provided on the abutment part to thereby shift the lever to clamping position.

12. In a clutch, the combination with a drivably connected clamping member and shiftable clamping plate adapted to grip a clutch plate therebetween, of an operating lever pivotally connected to the member and adapted to bear against the clamping plate and shift the same to clamping position, a link pivoted at one end on the lever, and means engageable with the opposite end of the link comprising an abutment part and a part movable relative to the abutment part, the abutment part being carried by an extension provided on the clamping plate and the movable part swinging the link against an inclined surface provided on the abutment part to thereby shift the lever to clamping position.

13. In a clutch, the combination with a drivably connected clamping member and shiftable clamping plate adapted to grip a clutch plate therebetween, of an operating lever pivotally connected to the member and adapted to bear against the clamping plate and shift the same to clamping position, a link pivoted at one end on the lever, and means engageable with the opposite end of the link comprising an abutment part and a part movable relative to the abutment part, the movable part being supported by an extension provided on the clamping plate and swinging the link against an inclined surface provided on the abutment part to thereby shift the lever to clamping position.

14. In a clutch, the combination with a drivably connected clamping member and shiftable clamping plate adapted to grip a clutch plate therebetween, of an operating lever pivotally connected to the member and adapted to bear against the clamping plate and shift the same to clamping position, a link pivoted at one end on the lever, and means engageable with the opposite end of the link comprising an abutment part and a part movable relative to the abutment part, both parts being carried by an extension provided on the clamping plate and the movable part swinging the link against an inclined surface provided on the abutment part to thereby shift the lever to clamping position.

15. In a clutch, the combination with a drivably connected clamping member and shiftable clamping plate adapted to grip a clutch plate therebetween, of an operating lever for shifting the clamping plate to clamping position, a part connected to the lever and movable with respect thereto, an abutment device, and a device movable relative to the abutment device, the movable device shifting the part against an inclined surface provided on the abutment device to thereby move the lever to clamping position, the surface being directed outwardly and towards the clamping plate.

16. In a clutch construction comprising friction elements engageable to provide a driving connection between rotary parts, the combination of a lever operably associated with the elements and rockable to effect their engagement, a part connected to the lever and movable with respect thereto, an abutment device, and a device movable relative to the abutment device, the movable device shifting the part against an inclined surface provided on the abutment device to thereby move the lever to clamping position, the surface being directed outwardly and towards the elements.

17. In a clutch, the combination of a clamping member, a shiftable clamping plate adapted to grip a clutch plate against the member, studs providing a driving connection between the member and clamping plate, operating levers each pivotally connected to a stud and adapted to bear against the clamping plate and shift the same to clamping position, a link pivoted at one end thereof on each lever, and means engageable with the opposite ends of the links comprising an abutment part and a part movable relative to the abutment part, the movable part swinging the links against an inclined surface provided on the abutment part to thereby shift the levers to clamping position.

18. In a clutch, the combination with a drivably connected clamping member and shiftable clamping plate adapted to grip a clutch plate therebetween, of an operating lever pivotally connected to the member and extending inwardly towards the axis of the clutch relatively close to and adapted to bear against the outer face of the clamping plate, a link pivoted at one end on the lever, and means engageable with the opposite end of the link comprising an abutment part and a part movable relative to the abutment part, the movable part swinging the link against an inclined surface provided on the abutment part to thereby shift the lever to clamping position.

19. In a clutch, the combination of a clamping member, a shiftable clamping plate adapted to grip a clutch plate against the member, studs providing a driving connection between the engine and clamping plate, operating levers each pivotally connected to a stud and extending inwardly toward the axis of the clutch relatively close to and adapted to bear against the outer face of the clamping plate, a link pivoted at one end thereof on each lever, and means engageable with the opposite ends of the links comprising an abutment part and a part movable relative to the abutment part, the movable part swinging the links against an inclined surface provided on the abutment part to thereby shift the levers to clamping position.

20. In clutch construction comprising friction elements engageable to provide a driving connection between rotary parts, the combination of a lever operably associated with the elements and rockable to effect their engagement, a part connected to the lever and movable with respect thereto, an abutment device, and a device movable relative to the abutment device, the movable device shifting the part against an inclined surface provided on the abutment device to thereby move the lever to clamping position and the abutment device being carried by an extension provided on one of the elements.

21. An adjusting device for a clutch having friction plates engageable to provide a driving connection between rotary parts comprising a member adapted to rotate with one of the plates, an adjusting ring threaded on the member and adapted to act as an abutment when the plates are engaged, a pressure element carried by the ring for engaging the threads on the member to maintain the adjusted position of the ring, and means carried by the ring for forcing the element into contact with the threads.

22. An adjusting device for a clutch having friction plates engageable to provide a driving connection between rotary parts comprising a member adapted to rotate with one of the plates, an adjusting ring threaded on the member and adapted to act as an abutment when the plates are engaged, a wire finger pivoted on the ring to engage the threads on the member and maintain the adjusted position of the ring, and a setscrew carried by the ring for forcing the finger into contact with the threads.

23. In a clutch, the combination with a drivably connected clamping member and shiftable clamping plate adapted to grip a clutch plate therebetween, of an operating lever pivotally connected to the member and extending inwardly towards the axis of the clutch relatively close and adapted to bear against the outer face of the clamping plate, the pivot connection of the lever to the member lying substantially in the plane of the clamping plate, a link pivoted at one end on the lever, and pinching means for shifting the lever to clamping position comprising coacting parts having angularly disposed surfaces engageable with the opposite end of the link, one of the parts being movable relative to the other.

PERCY H. BATTEN.
DONALD W. MORRIS.